United States Patent Office 3,451,522
Patented June 24, 1969

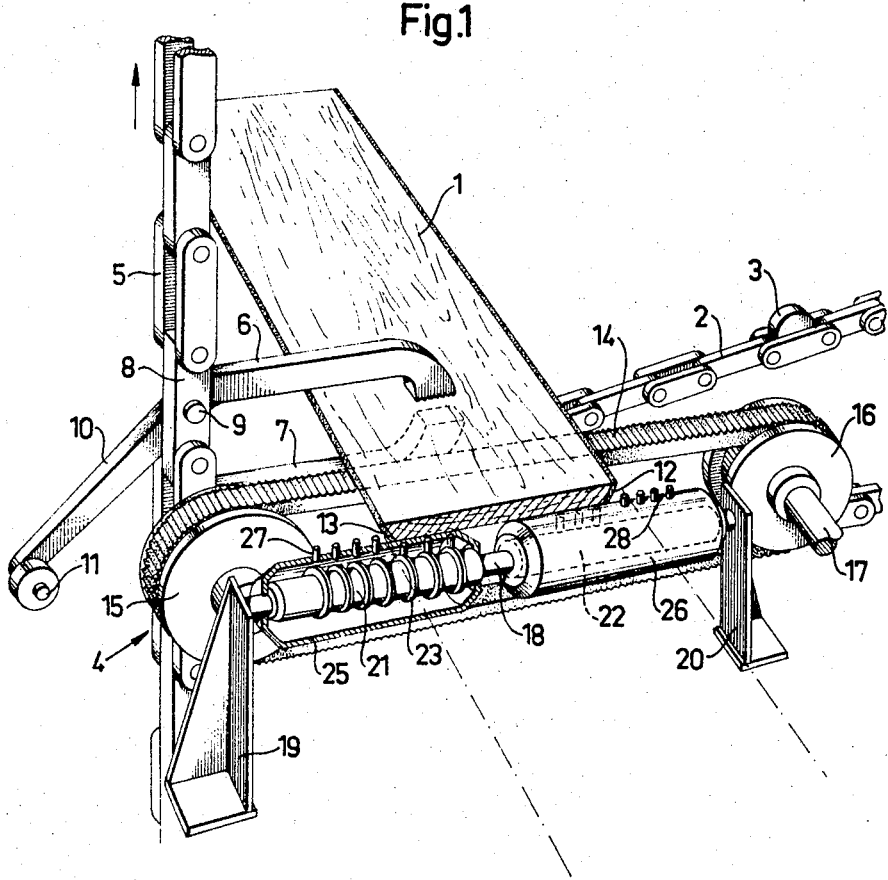

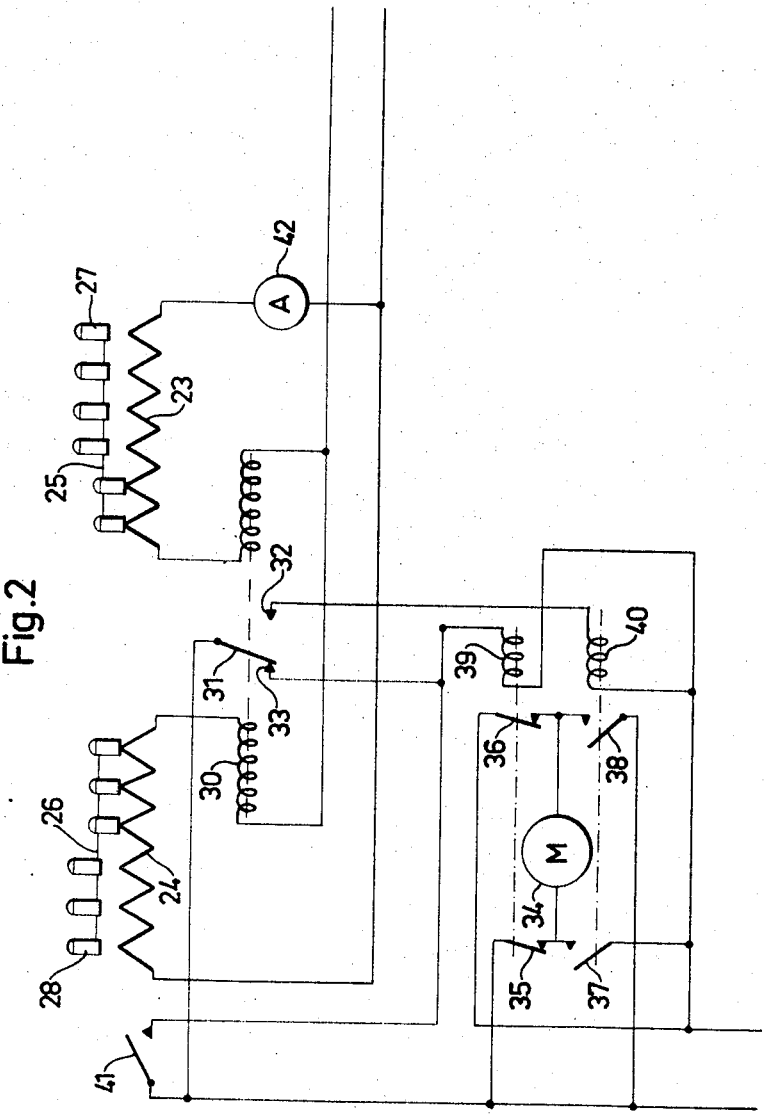

3,451,522
ARRANGEMENT FOR CENTERING AND DETERMINING THE WIDTH OF WORKPIECES
Gunnar Lennart Ahlstedt, Alfredshem, Sweden, assignor to Mo och Domsjo Aktiebolag, Ornskoldsvik, Sweden, a corporation of Sweden
Filed Sept. 20, 1967, Ser. No. 669,208
Claims priority, application Sweden, Sept. 27, 1966, 13,019/66
Int. Cl. B65g 47/22
U.S. Cl. 198—29
8 Claims

ABSTRACT OF THE DISCLOSURE

A device is provided for centering and/or determining the width of planks and like objects wherein a conveying means for conveying the plank in one plane and parallel with the dimension with respect to which the plank is to be centered, and with rows of circuit actuators capable of being deflected by the plank and extending in the conveying plane parallel with the conveying direction, the circuit actuators being arranged on both sides of and equidistant from a center line with which the centerline of the plank shall be caused to coincide, and which when deflected actuate the conveying means so that it moves the plank in either direction until an equal number of circuit actuators are deflected in both rows, whereupon the movement ceases.

---

The prevent invention relates to an arrangement for centering and determining the width of workpieces, which have at least one substantially flat side, such as planks and the like in a saw mill.

The invention is intended to provide a simple and reliable apparatus for this purpose.

The arrangement according to the invention includes a conveyor for moving the workpiece transversely to its longitudinal direction and two groups of depressable breakers mounted substantially in the conveying plane and which are arranged equi-distant from a centre line with which the center line of the workpiece is caused to coincide and which are arranged to actuate the drive means of the conveyor in such a manner that the workpiece is moved in either direction until an equal number of breakers in each group are depressed, whereupon the movement ceases; the number of depressed breakers determining the width of the workpiece.

The invention will now be described with reference to the accompanying drawing wherein FIGURE 1 shows a perspective view of one embodiment and FIGURE 2 shows a wiring chart of the electrical equipment of the arrangement.

The arrangement shown in FIGURE 1 is intended for determining the centerline of a plank which is to be machined along its edges for removing wanes and dull edges. The intention is that the plank shall be gripped by a series of tong-like tools at several positions along its length and advanced past a series of tools which cut the one wane, and then past a second series of tools which cut the second wane (the word wane being used to signify an imperfect edge). It is therefore important that the plank is advanced with its centre line in a determined position, relative to the series of tool, so that each series of tools, the cutting depth of which is adjusted in accordance with the previously measured width of the plank, machines respective edges to the same distance from the centre of the plank. The arrangement according to the invention is intended to ensure that the plank is centered and may in certain embodiments also serve to effect the advance of the plank in obtaining the requisite measuring values.

In the shown arrangement the plank is advanced transversely to its longitudinal direction by means of a conveyor, which in the shown instance is comprised of chains 2 presenting dogs 3, forward to the centering means 4, in accordance with the invention. Although only one chain 2 is shown on the drawing several parallel chains may be arranged, usually at least two situated one in the proximity of either end of the plank. Similarly, at least two centering means 4 are arranged close to each end of the plank, to ensure that the plank is accurately aligned across its total length. If the conveying means are so designed that the planks cannot possible go askew it is sufficient in certain cases to arrange one centering means 4 at the centre of the plank.

When the plank, in a manner which will be described below, has been centered by means of the means 4, the said plank is gripped by a tong-like gripping member arranged on a conveying chain 5. The gripping member includes an upper and a lower leg 6 and 7 respectively. The leg 7 is securely connected with a link 8 in the chain 5 so that it projects outwardly, perpendicular to the path of the chain, and on movement of the chain in the direction of the arrow abuts the bottom surface of the plank, as shown in FIGURE 1. The upper leg 6 is pivotally connected with the link 8 and 9 and has a backwardly and outwardly projecting arm 10 presenting a roller 11. The roller is guided in a curved track (not shown) in such a way that the leg 6 in raised position passes from below, beyond the edge of the plank 1 situated nearest the chain 5 and is then dropped against the top face of the plank, simultaneously as the lower leg comes in abutment with the bottom surface of the plank, so that the plank is gripped and on continued movement of the chain 5 is lifted to be conveyed to cutting tools which cut the one wane 12 of the plank. The plank is then transferred to a similar conveyor for transportation to tools which cut the other wane 13. As mentioned it is important that a center line of the plank is located in a determined position relative to the said tools, and consequently the gripping members 6, 7 must grip the plank as accurately as possible at its center line.

Naturally, several conveyor chains 5 presenting gripping means 6, 7 are arranged to grip the plank at several positions along its length. It is also obvious that the conveyors 5 are synchronised in some appropriate manner with the conveyor 2 and the centering means 4, so that the gripping means do not engage the plank until it has been centered.

The centering means 4 includes an endless belt 14 which passes over two rollers 15, 16, of which the one is driven via a shaft 17, by a non-shown electric motor. The plank 1 is placed by the conveyor 2 on the belt 14, the motor starting and the belt being driven so that the plank is still conveyed in the same direction.

Mounted on the side of the belt 14 is a switch means which includes a rod 18, the ends of which are secured in a support 19, 20. Mounted on the rod are two sleeves 21, 22 made of an insulating material, around which sleeves resistance wires are wound, of which only one, 23, is shown in FIGURE 1.

The resistance wires are connected in parallel by means of conductors, not shown, to a not-shown current supply.

Each sleeve 21, 22 with resistance wire is covered by a casing 25 and 26, respectively wherein a row of press buttons 26 and 28, respectively, are mounted; the number of buttons corresponding to the number of turns of the resistance wire. The buttons are so arranged that when depressed they contact the resistance wire and short circuit one revolution of the same. For this purpose the buttons and the casings 25, 26 may be of a conducting material, although insulated from the apparatus in general. The press buttons are spring loaded so that when released they automatically return to home position, out of contact with the resistance wires.

The two rows of press buttons 27, 28 extend parallel with the belt 14 i.e., transversely to the longitudinal direction of the plank 1, and there the same number of press buttons in each row, each button in the one row being mounted at the same distance from the centers plane as corresponding buttons in the second row; the term center plane being meant to indicate the vertical plane in which the center line of the plank is to be brought, i.e., a plane through the center of the abutment surfaces of the gripping means 6, 7. Further, the buttons are mounted so that in an unactuated position they project somewhat beyond the plane in which the upper surface of the belt 4 is located, and in their depressed position the upper surface of said buttons lies substantially in this plane, whereby they are depressed by the plank when it moves over the rows of buttons.

When the plank is moved by the belt 14 it depresses in rotation the buttons 28 on the casing 26, shown to the right in FIGURE 1, and then upon continued movement, the buttons 27. Providing that the number of pressed buttons 28 is greater than the number of depressed buttons 27 the movement continues but as soon as the number of depressed buttons is equal in both rows the drive motor of the belt 14 stops. The plank is thereby centered and is gripped at its center by the gripping means 6, 7. As mentioned above the conveying chain 5 is arranged to move in such a way that the plank is not gripped until the arrangement 4 has completed its function. Should, for some reason or other, more buttons 27 be depressed than buttons 28 the belt is driven in the opposite direction, until the number of depressed buttons is equal in both rows. This can occur if, for instance, several centering means 4 are situated along the longitudinal direction of the plank and the plank is fed in obliquely or is a bent plank, whereby certain of the centering means 4 may continue to operate whilst the others have stopped.

FIGURE 2 shows a wiring chart of the electrical equipment. The two resistance wires are shown diagrammatically at 23 and 24, and the rows of buttons at 27 and 28. The buttons in each row are shown electrically connected with conductors which may be comprised of the casings 25, 26. Each of the resistance wires is connected in series with a winding 29 and 30 resp. in a balance relay, which actuates a movable contact 21 in such a way that this lies against the one or the other of two stationary counter contacts 32, 33 when the current in the one winding predominates, whilst it adopts an intermediate position when the two amperages are equal. The two combinations of resistance wire and relay winding 23, 29 and 24, 30 respectively are connected in parallel to a current supply. The motor 34 driving the conveyor belt 14 is connected to the main power supply over relay actuated switches 35, 36, 37, 38 in such a way that the motor rotates in one direction when the switches 35, 36 are actuated and in the opposite direction when the switches 37 and 38 are actuated. The relay 39 actuating the switches 35, 36 is connected to the contact 33 and the relay 14 actuating the switches 37, 38 is connected to the contact 32. A switch 41 is connected to the relay 39 parallel with the contact 33. The said switch 41, which is not shown in FIGURE 1, is mounted so that it is actuated by the plank as soon as it reaches the belt 14. In this way the relay 39 is energized and closes the switches 35, 36 so that the motor 34 starts and drives the belt 14, so that conveyance of the plank continues. The plank then depresses the buttons 28, as mentioned above and as soon as two of the buttons are depressed the resistance in the wire 24 is less than in the wire 23 and hence the amperage in the relay winding 30 is higher than in the winding 29, the movable contact 31 closing against the stationary contact 33 so that the relay winding 39 constantly receives current, even after the plank has ceased to actuate the switch 41. On continued movement of the plank, buttons 27 are depressed but the relay 39 is actuated as long as more buttons 28 than buttons 27 are depressed. When the number of depressed buttons in both the rows is the same the amperage becomes equal in the two windings 29, 30 and the contacts 31 reassumes its intermediate position so that none of the relays 39 and 40 receive current, and the motor stops. If more buttons 27 than buttons 28 are depressed the relay 40 is energized and the motor functions in the opposite direction.

An ammeter 42 can be connected in the circuit of either circuit of the resistance wires, and used to give a measurement of the number of depressed buttons and thus the width of the plank. If several centering means are arranged along the long direction of the workpiece this feature can be utilized in subsequent machining of the plank so that on the basis of several obtained width measuring values the machining operation can be effected so that the best yield is obtained. Longer planks generally represent a higher sales value and a better volumetric efficiency when drying or being conveyed.

What is claimed is:

1. An apparatus for locating an elongated object relative to a reference point as a preliminary to further work on the object relative to the reference point, comprising, in combination, a plurality of sensing members disposed on each side of the reference point in position to contact the object at a series of different points transversely of the longitudinal axis of the object; conveying means adapted to move the object transversely of its longitudinal axis and across the sensing members; and means operatively associated with the conveying means and responsive to the contact between a predetermined number of sensing members and the object on each side of the reference point to cause the conveying means to move the object transversely of its longitudinal axis until such predetermined number of said sensing members are contacted on each side of the reference point, thereby locating the object relative to the reference point.

2. An apparatus in accordance with claim 1, in which the means for causing the conveying means to move the object transversely of the longitudinal axis of the object to locate the object relative to the reference point is responsive to a difference in the number of sensing members contacted, to cause the object to be moved transversely of its longitudinal axis until an equal number of sensing members on each side of the reference point are contacted thereby centering the object relative to the reference point.

3. An apparatus in accordance with claim 1, in which the sensing members comprise a row of pressure sensitive electrical contact members.

4. An apparatus in accordance with claim 3, in which the electrical contact members on each side of the reference point are adapted to short-circuit a portion of a resistor in an electrical circuit having a relay, said relay being adapted to control the supply of current to an electric motor which drives the conveying means.

5. An apparatus in accordance with claim 1, in which the object has a flat side and the conveying means is an endless belt, which engages the flat side of the object.

6. An apparatus in accordance with claim 1, including measuring means for determining the total number of sensing members engaged by the object on both sides of the reference point, said total indicating the total width of the object.

7. An apparatus in accordance with claim 6, in which the measuring means is an ammeter which measures the amount of current flowing a circuit resulting from the engagement of the object and the sensing members.

8. An apparatus for aligning a plank along its longitudinal axis comprising at least two sets of a plurality of sensing members in accordance with claim 1, disposed along the length of the object and spaced apart a distance less than the length of the object; and means for grasping the object and preventing its displacement from its aligned position.

References Cited

UNITED STATES PATENTS

| | | | |
|---|---|---|---|
| 3,082,368 | 3/1963 | Rowe | 83—364 |
| 3,175,438 | 3/1965 | Johnson | 83—364 |
| 3,212,377 | 10/1965 | Bennett | 83—364 |

RICHARD E. AEGERTER, *Primary Examiner.*

U.S. Cl. X.R.

83—364; 144—242; 198—40